(12) United States Patent
Darnell (10) Patent No.: US 11,564,529 B1
(45) Date of Patent: Jan. 31, 2023

(54) PORTABLE GRILLING APPARATUS

(71) Applicant: Billy Darnell, Wamego, KS (US)

(72) Inventor: Billy Darnell, Wamego, KS (US)

(*) Notice: Subject to any disclaimer, the term of this patent is extended or adjusted under 35 U.S.C. 154(b) by 0 days.

(21) Appl. No.: 17/722,812

(22) Filed: Apr. 18, 2022

Related U.S. Application Data (60) Provisional application No. 63/279,068, filed on Nov. 13, 2021.

(51) Int. Cl.
*A47J 37/07* (2006.01)
*A23B 4/052* (2006.01)

(52) U.S. Cl.
CPC ........... *A47J 37/0763* (2013.01); *A23B 4/052* (2013.01); *A47J 37/0786* (2013.01); *A23V 2002/00* (2013.01)

(58) Field of Classification Search
CPC ... A47J 37/0763; A47J 37/0786; A23B 4/052; A23V 2002/00
USPC .......................................................... 99/340
See application file for complete search history.

(56) References Cited

U.S. PATENT DOCUMENTS

| | | | | |
|---|---|---|---|---|
| 5,832,915 | A | * 11/1998 | Skidmore | A47J 37/0763 126/25 R |
| 2019/0313851 | A1 | * 10/2019 | Shemp | A47J 37/0718 |

* cited by examiner

*Primary Examiner* — Dana Ross
*Assistant Examiner* — Joseph W Iskra
(74) *Attorney, Agent, or Firm* — Dale J. Ream (57) ABSTRACT

A portable grilling apparatus includes a support base having a ring defining an opening and legs each having a first end depending from said ring and a second free end. The legs are angled outwardly from the ring such that said second ends define an open space. The apparatus includes a grill body having a bottom wall and a continuous sidewall extending upwardly therefrom and defining an interior area and an open top. In a grilling configuration, the bottom wall of the grill body is nested in the opening of the ring of the support base whereas in a storage configuration, the support base is inverted and the bottom wall of the grill body is nested in the interior space defined by the legs. The grilling apparatus includes a seating device enabling a user to be seated at the use configuration and for receiving/transporting the apparatus at the storage configuration.

18 Claims, 7 Drawing Sheets

A PORTABLE GRILLING APPARATUS

REFERENCE TO RELATED APPLICATIONS

This application claims the benefit of provisional patent application No. 63/279,068 filed Nov. 13, 2021 and titled A System of a Portable Grill with and Integrated Seat and Container, which is incorporated in its entirety, including its extensive manufacturing details and alternative embodiments.

BACKGROUND OF THE INVENTION

This invention relates generally to food grills and, more particularly, to a grilling apparatus that is modular so as to use actual grilling apparatus components for its transport, stowage, and seating.

Grilling is a truly American tradition. Grilling or smoking meat in an outdoor environment along with application of sauces or rubs or the like can make grilling a truly personal and family friendly activity. A portable grill may be very small whereas some other grills may be very large. In either case, most grills are awkward and not easily transportable from one location to another or create a mess with soot and debris during transport. This is unfortunate in that it may be desirable to transport once grill to a park or to a friend or relative's house.

Specifically, many portable grills and smokers suffer from four common problems, including 1) awkward size and shape, 2) transport and storage of accessory items, 3) the spread of dirt and debris, and 4) operator discomfort during use. Regarding (1), most grills are not easily disassembled or assembled again, are not modular, and may require multiple persons and the bed of a truck to transport. Regarding (2) a need for accessory devices, including cooking utensils, fuel, heat management devices, and the like may require special containers for storage or transport did regarding (3), portable grills or smokers are inherently creators of sit, ash, grease, and the like; all of which may contaminate the grill operator or other food items. Regarding (4), providing a seating option to a grill user is often overlooked but is critical especially when the grill surface may require the user to stand continuously or to lean over repeatedly.

Therefore, it would be desirable to have a portable grilling apparatus that is modular and uses its functional grilling structures as means for transporting or storing the grilling assembly. Further, it would be desirable to have a portable grilling apparatus having a seating element that also enables transport and storage, and prevents the spread of dirt and debris. In addition, it would be desirable to have a portable grilling apparatus in which accessory items are transportable without additional containers.

SUMMARY OF THE INVENTION

Accordingly, a portable grilling apparatus according to the present invention includes a support base that includes a ring defining an opening and that includes at least three leg members each having a first end depending from said ring and having a second end opposite said first end, respectively. The leg members are each angled outwardly away from the ring such that said second ends, collectively, define an open space. The grilling apparatus includes a grill body that includes a bottom wall and a continuous sidewall extending upwardly from said bottom wall, said bottom wall and said continuous sidewall defining an interior area and an upper edge of said continuous sidewall defining an open top through which the interior area is accessed. In a grilling configuration, the bottom wall of the grill body is nested in the opening of the ring of the support base whereas in a storage configuration, the support base is inverted and the bottom wall of the grill body is nested in an interior space defined by the legs of the support base.

The grilling apparatus includes a seating device enabling a user to be seated during operation at the use configuration and for receiving or transporting the apparatus at the storage configuration. The diameters of the component parts enable this modularity and allows the component themselves to facilitate storage and transport of the portable grilling apparatus.

Therefore, a general object of this invention is to provide a portable grilling apparatus that is configured to move modularly from a grilling configuration to a transport configuration.

Another object of this invention is to provide a portable grilling apparatus having a seating device that enables the grilling apparatus to be stored or transported.

Another object of this invention is to provide a portable grilling apparatus having a seating device that prevents the spread of dirt and debris.

Still another object of this invention is to provide a portable grilling apparatus in which components may be disassembled without tools and inverted for single trip portability.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a partially exploded view of the portable grilling apparatus as in FIG. 1a;

FIG. 3b is an exploded view of the portable grilling apparatus as in FIG. 3a;

FIG. 4b is an isolated view on an enlarged scale taken from FIG. 4a;

FIG. 5b is a partially exploded view of the portable grilling apparatus as in FIG. 5a;

DESCRIPTION OF THE PREFERRED EMBODIMENT

A portable grilling apparatus according to a preferred embodiment of the present invention will now be described with reference to FIG. 1a to 7 of the accompanying drawings. The portable grilling apparatus 10 may include a support base 20, a grill body 30, and a seating device 40. The innovation and of the present invention is best understood with specific references to the geometry of each component. In other words, the diameters and openings defined by the structures described and recited herein are not customary or obvious in the prior art.

According to the embodiment of the grilling apparatus 10 shown in FIGS. 1 to 4d, the support base 20 includes a rim 22 (a.k.a. a ring) having an annular or circular configuration that defines an opening having a first diameter. Further, the support base 20 includes at least three leg panels each having a first end 25 coupled to the rim 22 and each having a second end 26 opposite said first end, respectively. Preferably, each second end 26 includes a truncated configuration suitable for supporting the support base 20 atop a ground surface and that resists sinking into soft ground. Further, each of the at least three leg panels are spaced apart from one another about said rim 22. In a critical aspect, each leg panel 24 is angled outwardly and away from the rim 22 such that said second ends 26, collectively, define an imaginary second diameter that is larger than the first diameter defined by the rim 22.

The grill body 30 includes a bottom wall 32 having a circular configuration and a continuous sidewall 34 extending upwardly from a perimeter edge of the bottom wall 32, the bottom wall 32 and the continuous sidewall 34 together defining an open interior area. The continuous sidewall 34 includes an upper edge 36 defining an open top 37 through which the interior area may be accessed. In a critical aspect, the bottom wall 32 defines a third diameter that is smaller than said first diameter such that said bottom wall 32 and said continuous sidewall 34 adjacent said bottom wall 32 are received by the opening defined by the rim 22 in a nested relationship. Further, the upper edge 36 defines a fourth diameter that is larger than the third diameter, meaning that the continuous sidewall 34 has a continuously increasing diameter between the bottom wall 32 and the open top 37. Therefore, it will be understood, that the rim 22 acts as a stop to prevent over-nesting of the grill body 30 in the opening defined by the rim 22 of the support base 20. It is understood that the bottom wall 32 may include or be configured to support a base grate configured to hold charcoal or other fuel (illustrated but not numbered).

The portable grilling apparatus 10 may include a grate 50 positioned atop the upper edge 36 of the grill body 30 or, alternatively, nested on a shelf (not shown) adjacent the upper edge 36. It is understood that the grate 50 may include a plurality of metal rods or spokes each extending between a circular ring in a spaced apart manner conducive for supporting meat or other food items during cooking. In addition, the continuous sidewall 34 may define a vent opening 52 proximate the bottom wall 32 and may include a vent handle 54 that is operative to adjust a degree to which the vent opening 52 is either opened or closed, respectively.

Assembled as described above, the portable grilling apparatus 10 is now in a use configuration, i.e., briquettes may be inserted into the open interior area, ignited and, when sufficiently heated, meat or other foodstuffs may be grilled atop the grate 50.

Figure 1A:
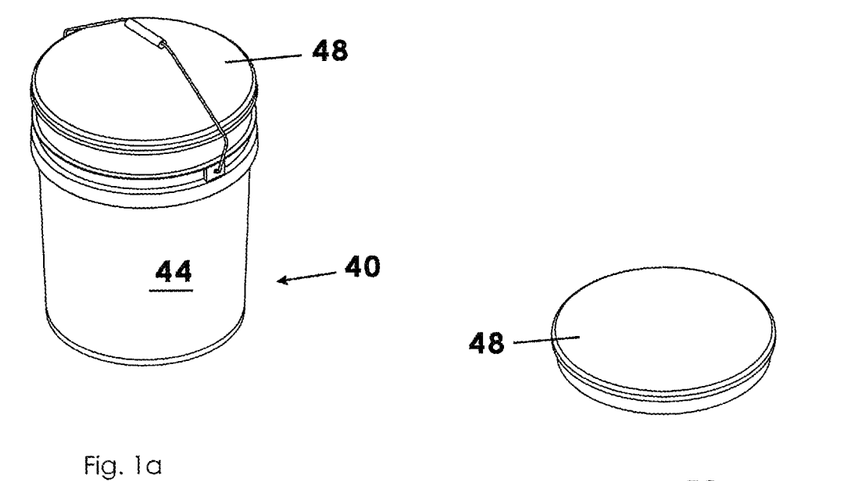
FIG. 1a is a perspective view of a portable grilling apparatus according to a preferred embodiment of the present invention, illustrated in a storage configuration.
Figure 1B:
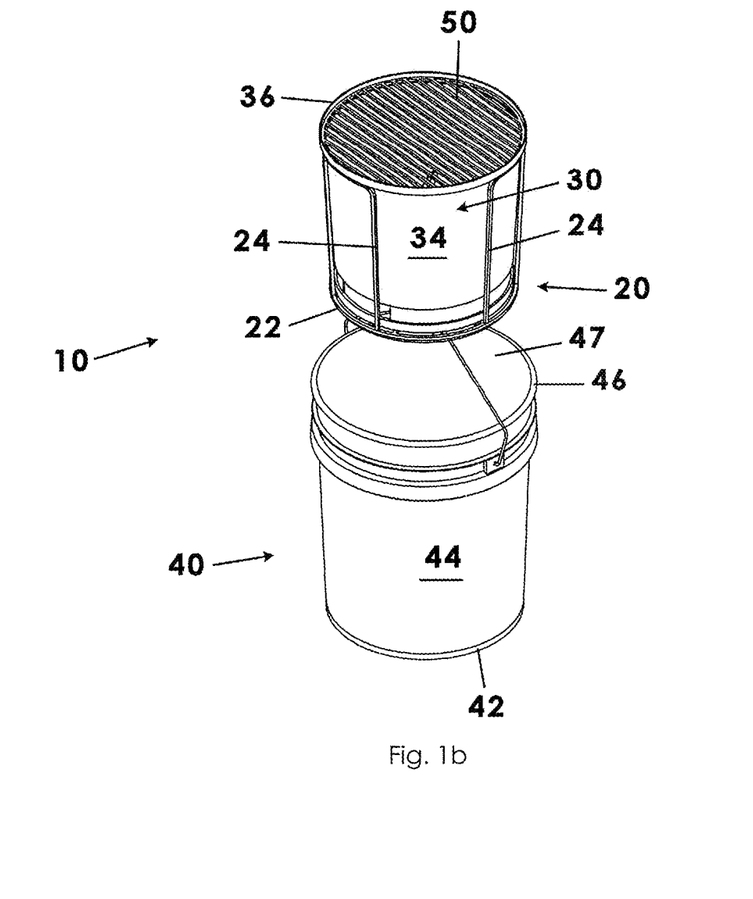
Figure 2:
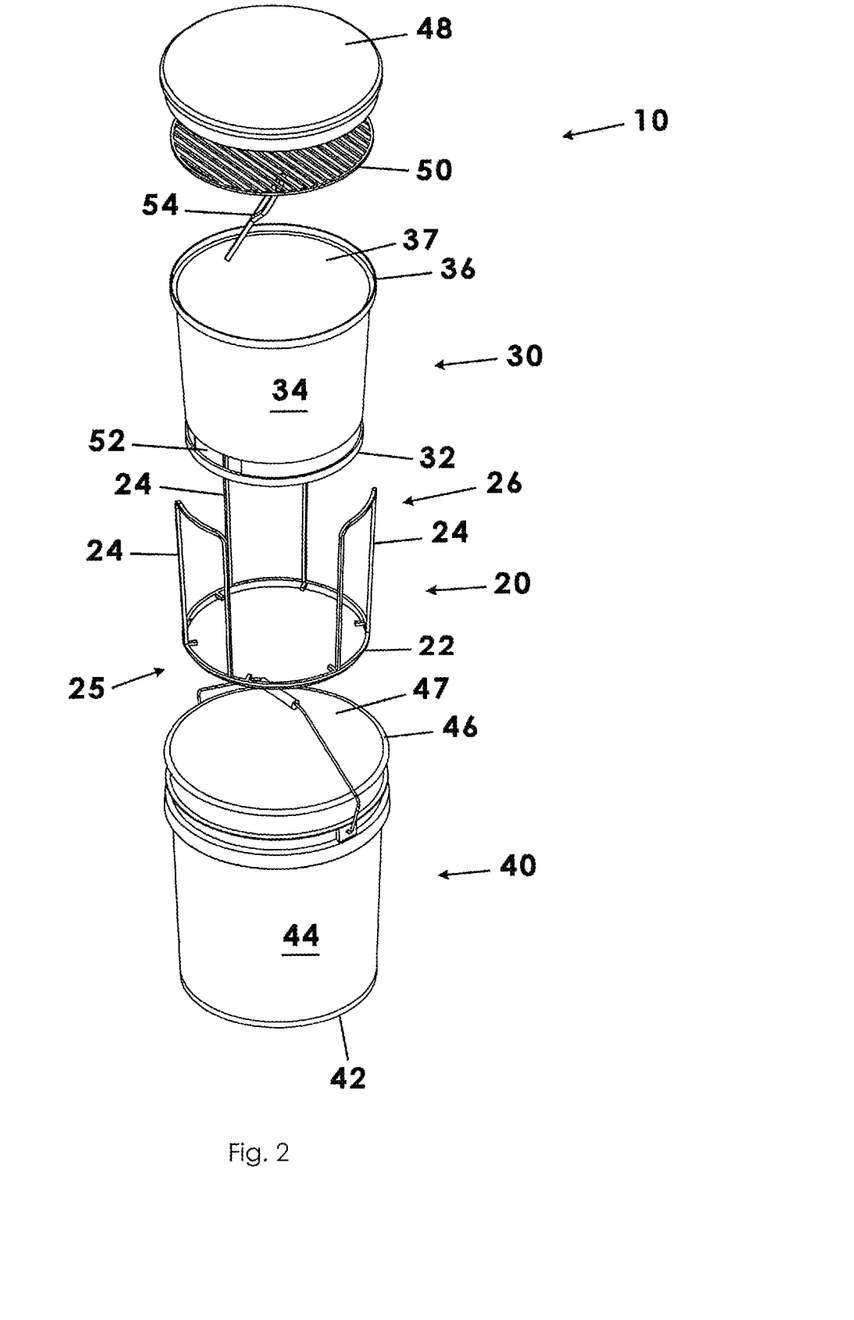
FIG. 2 is a complete exploded view of the portable grilling apparatus as in FIG. 1b.
Figure 3A:
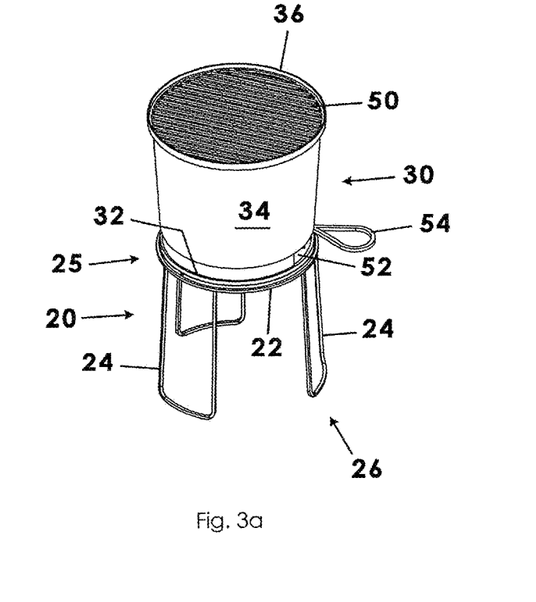
FIG. 3a is a perspective view of the portable grilling apparatus as in FIG. 1a, illustrated in a grilling configuration.
Figure 3B:
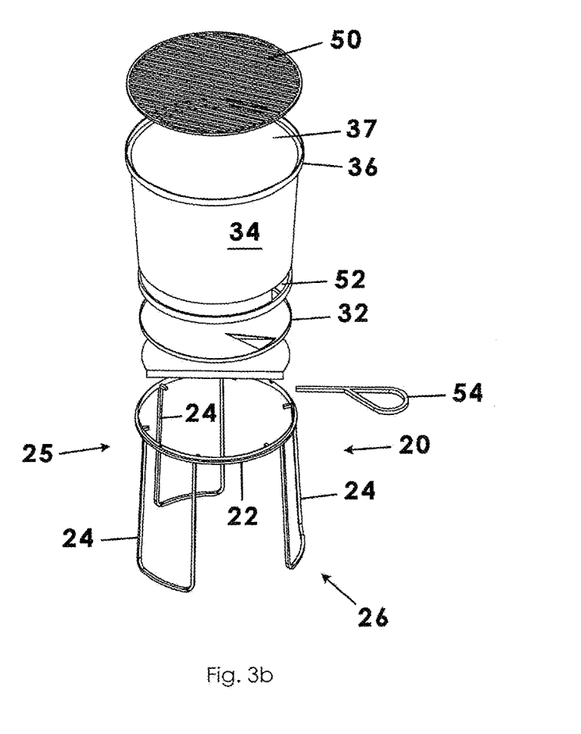
Figure 4A:
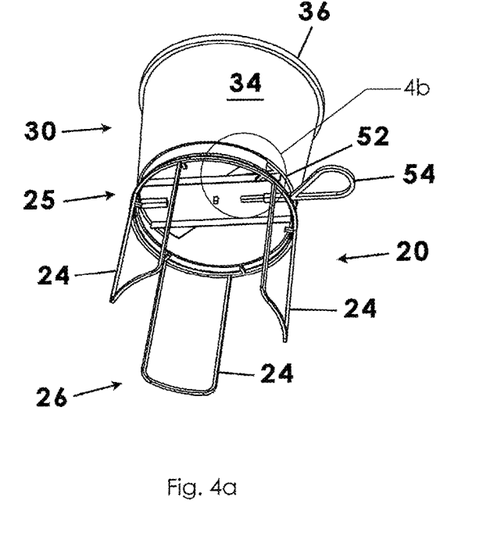
FIG. 4a is a perspective view from a lower angle of the portable grilling device as in FIG. 3a, illustrated with a vent and handle and a first configuration.
Figure 4B:
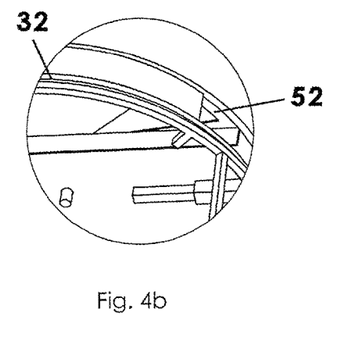
Figure 4C:
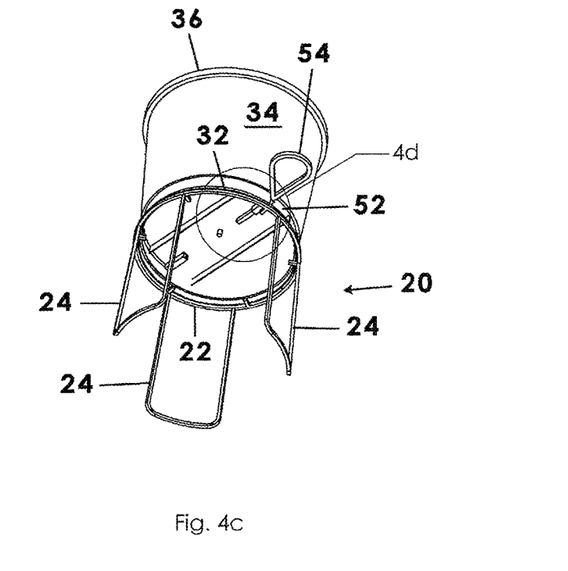
FIG. 4c is a perspective view from a lower angle of the portable grilling device as in FIG. 3a, illustrated with a vent and handle and a second configuration.
Figure 4D:
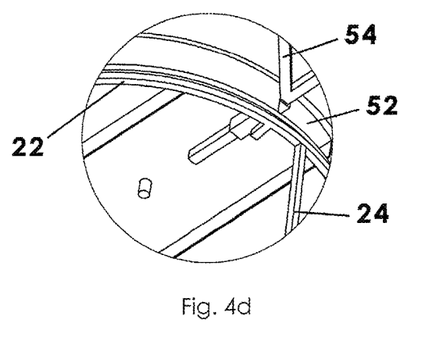
FIG. 4d is an isolated view on an enlarged scale taken from FIG. 4c.
Figure 5A:
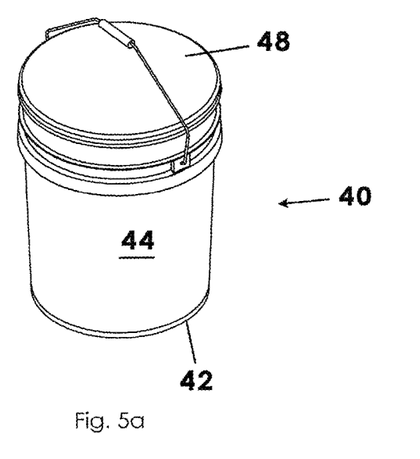
FIG. 5a is a perspective view of a portable grilling apparatus according to another preferred embodiment of the present invention, illustrated in a storage configuration.
Figure 5B:
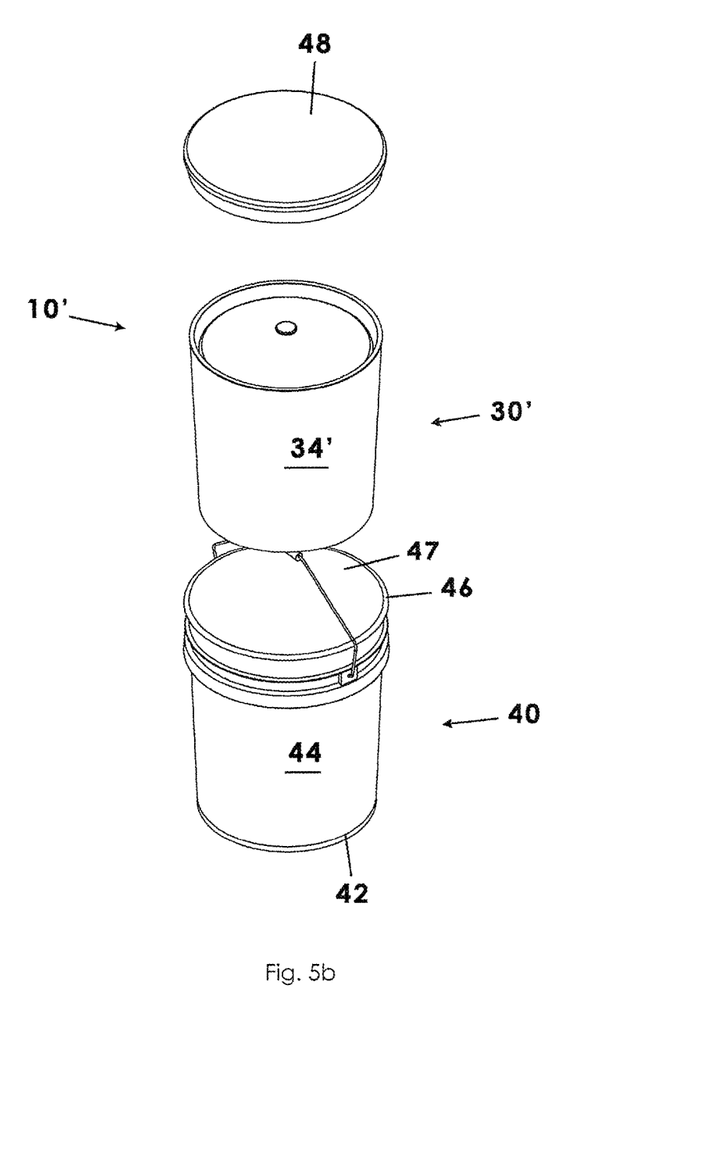

In another critical aspect, the support base 20 is configured, when inverted, to receive the grill body 30 in a storage or transport configuration (FIG. 2). More particularly, the second diameter defined, collectively, by the second ends 26 of the at least three leg panels 24, respectively, is larger than the third diameter defined by the bottom wall 32 of the grill body 30 such that the second ends of the inverted support base 20 are configured to receive the bottom wall 32 of the grill body 30 (FIG. 1b). Stated still another way, the larger diameter of the support base 20 (i.e., the second diameter) selectively receives the smaller diameter of the grill body 30 (i.e., the third diameter) in a nested relationship now referred to as a storage or transport configuration (FIG. 1b). Again, the at least three leg panels 24 act as a stop as the upwardly increasing diameter of the grill body 30 is received therebetween. It will also be understood that grill accessories (not shown) such as a spatula, fuel, condiments, brush, and the like may be deposited into the interior area defined by the grill body 30 when transforming to the storage and transport configuration.

In a critical aspect, the portable grilling apparatus 10 may include a seating device 40 that enables a user/griller to be seated at just the right height when seated adjacent the grill body 30 in the use configuration so as to not have to lean over or stand for long periods of time. More particularly, the seating device 40 may include a bottom 42 that is closed and a continuous side panel 44 extending upwardly from a perimeter edge of the bottom 42, the bottom 42 and the continuous side panel 44 together defining an open interior space. Preferably, the bottom has a circular configuration that defines a fifth diameter.

The side panel 44 includes a top edge 46 defining an open top 47 that defines a sixth diameter, is open, and through which the interior space may be accessed. The seating device 40 includes a cover that is removably coupled atop the top edge 46 for selectively covering the open top 47, the cover 48 having a rim or lip for stability as a seat when positioned on the top edge (FIG. 1a). In a critical aspect, the fifth diameter is smaller than the sixth diameter as is indicative that the side panel of the seating device 40 has an increasing diameter when consider from bottom to top.

Importantly, the sixth diameter (associated with the open top) is larger that the first diameter (associated with bottom wall 32 of the grill body 30 such that open top 37 is configured to receive the bottom wall 32 of the grill body 30 into the interior space of the seating device 40. More specifically, the seating device 40 has a configuration that is concentrically larger than a configuration of the first and second diameters associated with the support base 20 such that the combined support base 20 and grill body 30 may be received into the interior space of the seating device 40 in a nested relationship. In other words, the seating device 40 is configured to receive the portable grilling apparatus 10 when first oriented at the storage configuration. The cover 48 may be positioned again so as to cover the open top 47 and the now stowed portable grilling apparatus may be transported or stored such as in a closet, garage, or automobile trunk.

In another embodiment of a grilling apparatus 10', the grill body may be in the form of a smoker 11, a.k.a., a meat smoker system. The same reference numerals with a prime character are used for referencing components that are substantially the same. As shown, the smoker 11 may include more or fewer components than originally disclosed in the portable grilling apparatus 10 first described above.

Figure 6:
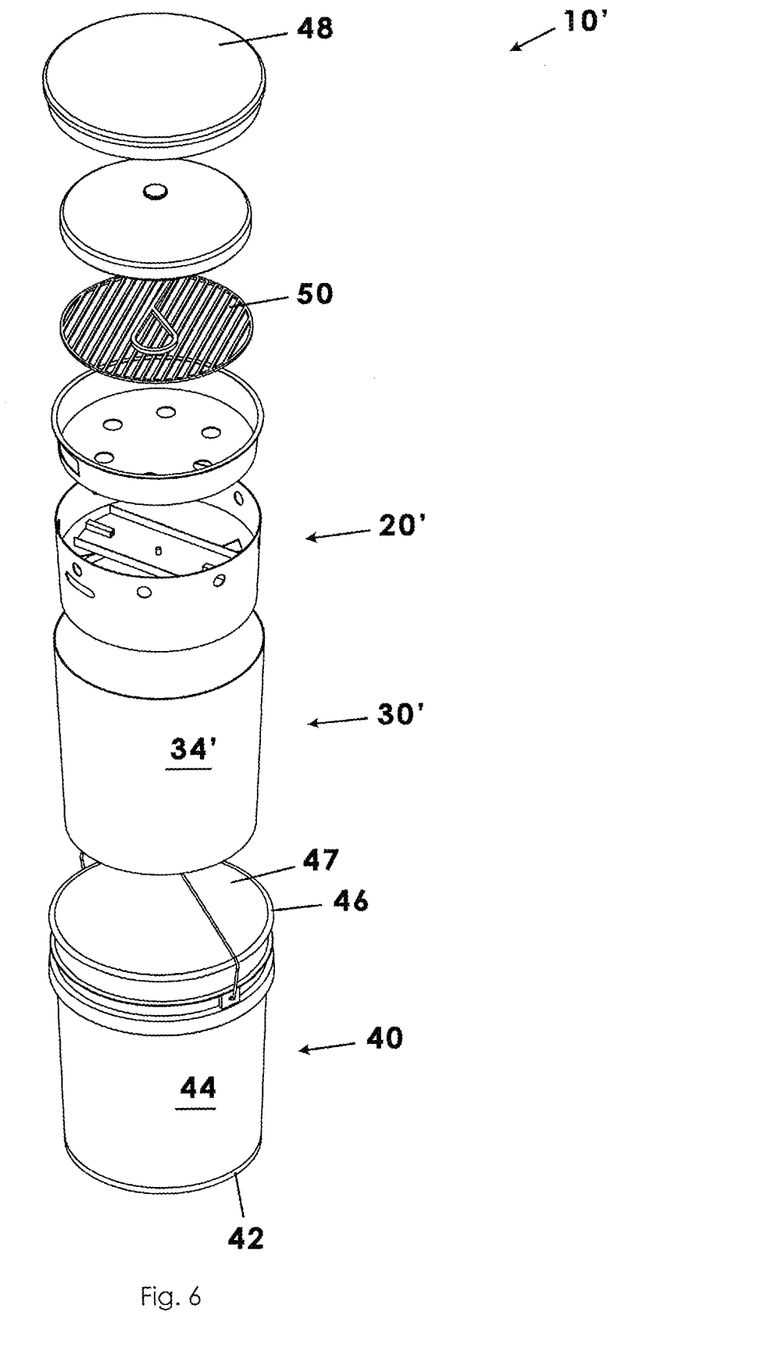
FIG. 6 is a complete exploded view of the portable grilling apparatus as in FIG. 5b.
Figure 7:
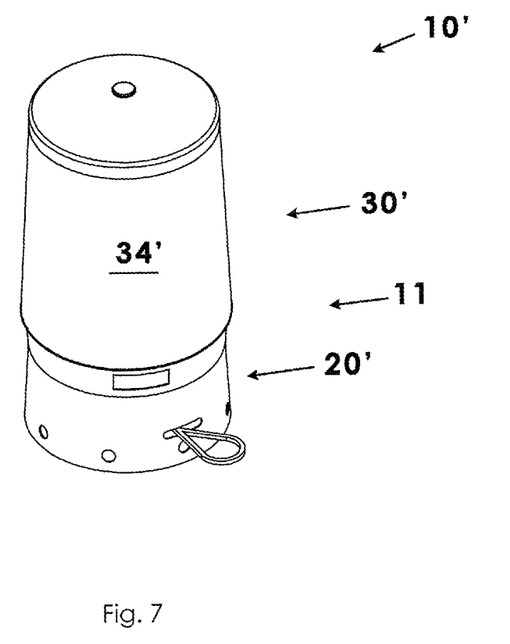
FIG. 7 is a perspective view of the portable grilling apparatus in a grilling/use configuration according to the present invention.

The structure and function, however, of the smoker 11 embodiment is substantially similar to that described above except as noted below. The same numerals are used in the drawings for like structures and primed numerals for structures that are similar but modified. For instance, the smoker 11 may include a grill body 30' that includes a continuous sidewall 34' that defines an interior void and both upper and lower open ends and having an increasingly smaller diameter when considering the sidewall between the lower and upper ends, respectively. The open lower end of the continuous sidewall 34' of the smoker embodiment may be nested atop a base portion 20' when assembled in a normal grilling/use configuration (FIG. 7). The base portion 20' may include a vent and handle for adjusting the vent opening. As described above, the grill body 30' may be easily disassembled/disconnected from the base portion 20' and, in this embodiment, the grill body 30' may be inverted so as to receive the base portion 20' into the interior void via the open lower end in a storage configuration (FIG. 6). Further, the grilling apparatus 10' may include a seating device 40' having a construction substantially as first described above.

The astute reader will observe that the diameters of respective ends of component parts and directions of increasingly larger diameters are opposite those first described above; however, the transformation between a use configuration and storage configuration is substantially the same. Stated another way, a respective grill body 30' and support base 20' may be configured for use as a portable grill or quickly reconfigured into a nested storage configuration. Further either grilling apparatus may then be transported or stored inside a cavity of a seating device 40'.

In use, the portable grilling apparatus 10 has minimal main components so as to be easy to assemble, disassemble, and invert. More particularly, the bottom wall 32 of the grill body 30 may be nested in the ring 22 of the support base 20 at the use configuration. Then, when it is desired to store or transport the grilling apparatus 10, the grill body 30 may be removed from its nested coupling with the support base 20 and the support base 20 may be inverted, i.e., turned upside down, such that the support legs are extending upwardly and outwardly. With the support base 20 inverted, the free ends of the legs are configured to receive the bottom wall 32 of the grill body in a storage configuration. Further, the portable grilling apparatus 10 includes a seating device 40 configured to receive the grill body 30 and support base 20 when in the storage configuration. Importantly, the seating device 40 includes a cover 48 that may be positioned atop an open end of the seating device 40 that enables a user to sit while grilling.

Still another embodiment is conceived. Namely, a portable firepit assembly may include a firepit reservoir (having legs), a pair of foldup lawn chairs, and a specialty backpack. Preferably, the backpack includes an interior space configured to receive the firepit reservoir, Further, the backpack may include a pair of sleeves each configured to receive a folded and bagged lawn chair. When bagged up in the specialty backpack, the firepit assembly is stored, portable, and ready for transport or storage.

It is understood that while certain forms of this invention have been illustrated and described, it is not limited thereto except insofar as such limitations are included in the following claims and allowable functional equivalents thereof.

The invention claimed is:

1. A portable grilling apparatus, comprising:
    a support base that includes a ring defining an opening having a first diameter, said support base including at least three leg members each having a first end coupled to and depending from said ring and having a second end opposite said first end, respectively;
    wherein the at least three leg members are each angled outwardly away from the ring such that said second ends, collectively, define an imaginary second diameter that is greater than said first diameter and define an open space;
    a grill body that includes a bottom wall and a continuous sidewall extending upwardly from said bottom wall, said bottom wall and said continuous sidewall defining an interior area and an upper edge of said continuous sidewall defining an open top through which the interior area is accessed;
    wherein said bottom wall of said grill body has a circular configuration that defines a third diameter that is less than said first diameter so that said bottom wall and said continuous sidewall are selectively and removably received in the opening defined by said ring;
    wherein said second diameter defined by the second ends of the at least three leg members, collectively, is larger than said third diameter such that said bottom wall is selectively and removably received into the open space between said second ends but only when said support base is removed from said grill body and said support base is inverted.

2. The portable grilling apparatus as in claim 1, wherein:
    said grill body is at a use configuration when said bottom wall is received in the opening defined by said ring; and
    said grill body is at a stowed configuration when said bottom wall is received in the open space associated with said support.

3. The portable grilling apparatus as in claim 2, wherein said upper edge of the continuous sidewall has a circular configuration defining a fourth diameter that is larger than said third diameter defined by said bottom wall so that said continuous sidewall has a continuously increasing diameter between said bottom wall and said upper edge.

4. The portable grilling apparatus as in claim 3, wherein said continuous sidewall is a stop that bears frictionally against said ring when said bottom wall is received into said opening of said ring at said use configuration, thereby preventing over-insertion of said grill body in said ring.

5. The portable grilling apparatus as in claim 3, wherein said continuous sidewall is a stop that bears frictionally against said at least three leg members when said bottom wall is received into said open space associated with said second ends at said stowage configuration, thereby preventing over-insertion of said grill body.

6. The portable grilling apparatus as in claim 1, further comprising a grate having a circular configuration and removably positioned atop said upper edge of said grill body, said grate including a plurality of rods that are parallel to and spaced apart from one another about a circular ring.

7. The portable grilling apparatus as in claim 2, further comprising:
    a seating device having a bottom defining a fifth diameter and a continuous side panel extending upwardly from the bottom such that the bottom and continuous side panel, together, define an open interior space,
    said seating device having a top edge defining an open top through which said open interior space is accessible and that defines a sixth diameter that is larger than said fifth diameter such that said continuous side panel has a continuously increasing diameter between said bottom and said top edge.

8. The portable grilling apparatus as in claim 7, wherein said seating device includes a cover movable between a seating configuration positioned atop said top edge so as to block access to said open interior space and a storage configuration displace from said top edge that allows access to said open interior space.

9. The portable grilling apparatus as in claim 8, wherein said sixth diameter is larger than said first diameter and said second diameter such that said grill body and said support base are receivable into said open interior space when at the stowage configuration.

10. A method for deploying and transporting a portable grilling apparatus, comprising:
providing a support base that includes a ring defining an opening, said support base including at least three leg members each having a first end coupled to and extending downwardly from said ring and each having a second end opposite said first end, respectively;
wherein the at least three leg members are each angled outwardly away from the ring such that said second ends, collectively, define an open space therebetween;
providing a grill body that includes a bottom wall and a continuous sidewall extending upwardly from said bottom wall, said bottom wall and said continuous sidewall together defining an interior area, said continuous sidewall having an upper edge defining an open top through which the interior area is accessed;
said opening defined by said ring receiving said bottom wall of said grill body so as to form a grilling configuration;
displacing said grill body from said support member; and
inverting said support base so that said at least three leg members extend upwardly, said open space defined by said second ends receiving said bottom wall of said grill body in a nested arrangement so as to form a storage configuration.

11. The method as in claim 10, wherein
said opening associated with said ring defines a first diameter;
said second ends of said at least three leg members, collectively, define an imaginary second diameter that is larger than said first diameter and, together, define said open space for said receiving said bottom wall of said grill body into said open space when in said storage configuration.

12. The method as in claim 11, wherein said bottom wall of said grill body has a circular configuration that defines a third diameter that is less than said first diameter so that said bottom wall and said continuous side wall of said grill body are selectively and removably received in the opening defined by said ring of said support base when in said storage configuration.

13. The method as in claim 12, wherein said upper edge of the continuous sidewall has a circular configuration that defines a fourth diameter that is larger than said third diameter defined by said bottom wall so that said continuous sidewall has a continuously increasing diameter between said bottom wall and said upper edge.

14. The method as in claim 12, further comprising said continuous sidewall bearing frictionally against said at least three leg members when said bottom wall is received into said open space associated with said second ends at said storage configuration, thereby preventing over-insertion of said grill body.

15. The method as in claim 10, further comprising providing a grate having a circular configuration and being removably positioned atop said upper edge of said grill body, said grate including a plurality of rods that are parallel to and spaced apart from one another about a circular ring.

16. The method as in claim 2, further comprising:
providing a seating device having a bottom defining a fifth diameter and having a continuous side panel extending upwardly from the bottom such that the bottom and continuous side panel, together, define an open interior space,
said seating device having a top edge defining an open top through which said open interior space is accessible and that defines a sixth diameter that is larger than said fifth diameter such that said continuous side panel has a continuously increasing diameter between said bottom and said top edge.

17. The method as in claim 16, wherein said seating device includes a cover movable between a seating configuration positioned atop said top edge so as to block access to said open interior space and a storage configuration displace from said top edge that allows access to said open interior space.

18. The method as in claim 17, wherein said sixth diameter is larger than said first diameter and said second diameter, said method comprising said open interior space of said seating device receiving said grill body and said support base when said grill body and said support are at the storage configuration.

* * * * *